(12) United States Patent
Kong

(10) Patent No.: US 6,576,329 B2
(45) Date of Patent: Jun. 10, 2003

(54) MULTILAYER THERMOPLASTIC FILM

(75) Inventor: Dan-Cheng Kong, Fairport, NY (US)

(73) Assignee: ExxonMobil Oil Corporation, Fairfax, VA (US)

(*) Notice: Subject to any disclaimer, the term of this patent is extended or adjusted under 35 U.S.C. 154(b) by 0 days.

(21) Appl. No.: 09/879,676

(22) Filed: Jun. 12, 2001

(65) Prior Publication Data

US 2002/0187326 A1 Dec. 12, 2002

(51) Int. Cl.[7] .................................................. B32B 7/02
(52) U.S. Cl. ............... 428/213; 264/173.19; 264/210.1; 428/215; 428/323; 428/327; 428/331; 428/336; 428/337; 428/412; 428/447; 428/451; 428/516; 428/518; 428/520
(58) Field of Search ................... 428/213, 215, 428/336, 337, 412, 447, 451, 323, 327, 331, 516, 518, 520; 264/173.9, 210.1

(56) References Cited

U.S. PATENT DOCUMENTS

| | | | |
|---|---|---|---|
| 4,237,334 A | 12/1980 | Kojima et al. ............. 174/25 R |
| 4,377,616 A | 3/1983 | Ashcraft et al. ............. 428/213 |
| 4,594,211 A | 6/1986 | Mohnhaupt ................. 264/141 |
| 4,632,869 A | 12/1986 | Park et al. ................. 428/315.5 |
| 4,652,489 A | 3/1987 | Crass et al. ................. 428/337 |
| 4,734,317 A | 3/1988 | Bothe et al. ................. 428/215 |
| 4,741,950 A | 5/1988 | Liu et al. ................. 428/315.5 |
| 4,758,396 A | 7/1988 | Crass et al. ................. 264/145 |
| 4,758,462 A | 7/1988 | Park et al. ................. 428/213 |
| 4,769,418 A | * 9/1988 | Mizuno et al. ............. 425/500 |
| 4,978,436 A | 12/1990 | Kelly ......................... 204/165 |
| 5,176,954 A | 1/1993 | Keller et al. ............. 428/317.9 |
| 5,397,635 A | 3/1995 | Wood, Jr. ................. 428/314.4 |
| 5,854,356 A | 12/1998 | Bergstrom et al. ....... 525/326.5 |
| 5,888,648 A | 3/1999 | Donovan et al. ........... 428/349 |
| 5,972,490 A | 10/1999 | Crighton et al. ......... 428/315.5 |
| 5,972,496 A | 10/1999 | Bader et al. ................. 428/331 |
| 5,981,079 A | 11/1999 | Mount, III et al. ......... 428/461 |
| 6,004,664 A | 12/1999 | Sasaki et al. ............. 428/314.2 |
| 6,013,353 A | 1/2000 | Touhsaent ................... 428/203 |
| 6,025,059 A | 2/2000 | McGee et al. ............... 428/219 |
| 6,068,026 A | 5/2000 | Garois ......................... 138/126 |
| 6,074,762 A | 6/2000 | Cretekos et al. ............. 428/516 |
| 6,077,602 A | 6/2000 | Liestman et al. ........... 428/327 |
| 6,104,422 A | 8/2000 | Kuboyama et al. ......... 347/212 |
| 6,106,820 A | 8/2000 | Morrissey et al. ....... 424/78.18 |
| 6,165,444 A | 12/2000 | Dubief et al. ................. 424/45 |

OTHER PUBLICATIONS

Database WPI, Section Ch, Week 199435, Derwent Publications Ltd., London, GB; Class A17, AN 1994–283036; XP002210258; & JP 06 210809 A.

Database WPI, Section Ch, Week 19907, Derwent Publications Ltd., London, GB; Class A96, AN 1999–075424; ZP002210259 & JP 10 315404 A.

\* cited by examiner

Primary Examiner—D. S. Nakarani
(74) Attorney, Agent, or Firm—Rick F. James; Keith A. Bell

(57) ABSTRACT

A thermoplastic film comprising a core layer comprising a polyolefin wherein the core layer comprises the interior of the film; and a first skin layer comprising a silicone grafted polymer, wherein the first skin layer is exterior to the core layer.

31 Claims, 2 Drawing Sheets

MULTILAYER THERMOPLASTIC FILM

BACKGROUND OF THE INVENTION

This invention relates to the field of polymer films and methods for forming such films, and in particular, to a film possessing a polyolefin core layer faced on at least one side thereof with a skin layer containing a silicone grafted polymer.

Heat sealable multilayer films which are useful as packaging materials are known in the art.

U.S. Pat. No. 6,165,444 describes a cosmetic or dermatological composition for treating keratinous material, particularly human hair, including a cosmetically or dermatologically acceptable medium containing at least one silicone-grafted polymer with a polysiloxane portion and a portion consisting of a non-silicone organic chain, wherein one of the two portions constitutes the main polymeric chain while the other is grafted onto said main chain, an at least one selected fatty-chain amide. Such compositions are particularly suitable for use as rinsable or non-rinsable products for washing and conditioning hair, hair setting or hair styling. U.S. Pat. No. 6,165,444 is incorporated herein by reference in its entirety.

U.S. Pat. No. 6,106,820 describes a cosmetic compositions comprising: (a) from about 0.1% to about 50%, based on the weight of the composition, of a film-forming graft copolymer, wherein the copolymer comprises: (i) a backbone exhibiting a T[g]of from about 0° C. to about 50° C.; and (ii) one or more hydrophilic grafts attached to the backbone wherein each of the grafts exhibits a T[g]of from about 50° C. to about 200° C., and wherein the average molecular weight of each of the grafts is greater than about 1000; and (b) from about 50% to about 99.9%, based on the weight of the composition, of a suitable carrier. The compositions provide good wear properties and are suitable for use in a variety of cosmetic applications, such as facial moisturizers, foundations, lipsticks, mascaras, nail polishes and the like. In a preferred embodiment, the compositions are in the form of a nail polish which, when applied to nails, exhibit excellent long wear properties. U.S. Pat. No. 6,106,820 is incorporated herein by reference in its entirety.

U.S. Pat. No. 6,104,422 describes a sublimation thermal image transfer recording method for thermally forming images on an image receiving sheet prepared by forming a dye-receiving layer on a substrate, includes the steps of superimposing a sublimation thermal image transfer recording sheet which has a substrate and at least one recording layer formed thereon containing a sublimable dye, on the image receiving sheet in such a manner that the recording layer of the recording sheet comes into contact with the dye-receiving layer of the image receiving sheet, recording images on the dye-receiving layer of the image receiving sheet by applying thermal energy Ei imagewise to the recording sheet from the substrate side thereof using a thermal head, and subjecting the image-bearing image receiving sheet to heat treatment by applying thermal energy Eb to the image receiving sheet using the thermal head through a sheet member for heat treatment, the thermal energy Eb being smaller than the thermal energy Ei. In the image receiving sheet, an overcoat layer may be formed on the dye-receiving layer, the overcoat layer having a dynamic friction coefficient of less than 0.45 which is measured in accordance with ASTM-0 1894 and containing a silicone resin and a lubricant. U.S. Pat. No. 6,104,422 is incorporated herein by reference in its entirety.

U.S. Pat. No. 5,854,356 describes a polymer for release films of surfaces containing pressure-sensitive adhesives. The polymer includes a reactive polyolefin and a reactive release substance, which are chemically bonded together as a result of being compounded in a molten state. The invention also relates to a release film for surfaces containing pressure-sensitive adhesives. U.S. Pat. No. 5,854,356 is incorporated herein by reference in its entirety.

U.S. Pat. No. 4,237,334 describes a laminated insulating paper formed of cellulose paper or papers which is adhered to at least one side of cross-linked silicone grafted polyolefin film and to an oil-filled (OF) cable which insulated by the laminated insulating paper. The laminated insulating paper has outstanding peel strength as well as excellent non-solubility and anti-swelling properties in insulating oils. U.S. Pat. No. 4,237,334 is incorporated herein by reference in its entirety.

U.S. Pat. No. 4,734,317 describes a polyolefin film having a base layer composed essentially of propylene polymers and having sealing layers present on both sides, composed essentially of sealable olefin polymers. Polydialkylsiloxane is incorporated in a first of the two sealing layers, and this layer is not subjected to corona treatment. The second sealing layer is subjected to corona treatment and has polydialkylsiloxane, not incorporated, but present on its outer surface, the polydialkylsiloxane having been transferred to this layer by contact with the sealing layer in which polyidalkylsiloxane is incorporated. The relative polydialkylsiloxane occupancy on the second layer, which is determined by means of ESCA spectroscopy, is not more than 15. The three-layer polyolefin film is prepared by a coextrusion process. It is particularly suitable for use as a packaging film on high-speed packaging machines. U.S. Pat. No. 4,734,317 is incorporated herein by reference in its entirety.

U.S. Pat. No. 6,074,762 describes a block-resistant film which comprises a core layer of a thermoplastic polymer having a first side and a second side; a functional layer which is printable or sealable or treatable for printing or sealing is on the first side of the core layer, and a block-resistant layer is on the second side of the core layer. The block-resistant layer comprises a thermoplastic polymer and an amount of a polydialkylsiloxane, based upon the entire weight of the block-resistant layer, sufficient to inhibit blocking of the block-resistant layer to the functional layer when they are in contact and which polydialkylsiloxane deposits silicon onto the functional layer but the amount of silicon deposited is not substantially detrimental to the printing function or the sealing function. U.S. Pat. No. 6,074,762 is incorporated herein by reference in its entirety.

SUMMARY OF THE INVENTION

In accordance with the present invention, there is provided a polymer film possessing a low coefficient of friction, which comprises:

(a) a core layer comprising a polyolefin wherein the core layer comprises the interior of the film;

(b) a first skin layer comprising a silicone grafted polymer, wherein the first skin layer is exterior to the core layer.

The advantages of the present invention include one or more of the following:

A film which can be sealed on both sides.

A film which can be treated on both sides.

A film which is composed of multiple layers.

A film which has high scratch resistance.
A film which has good slip properties
A film which is transparent
A film which has good printability
A film which has decreased coefficient of friction
A film which has decreased hot slip
A film without loss of sealability after treatment
A film with less silicone fall out at the surface
A film with chemically bonded silicone For a better understanding of the present invention, together with other and further objects, reference is made to the following description, taken together with the accompanying drawings, and its scope will be pointed out in the appended claims.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of several illustrative embodiments when read in conjunction with the accompanying drawings, wherein:

DETAILED DESCRIPTION OF THE DRAWINGS

Figure 1:
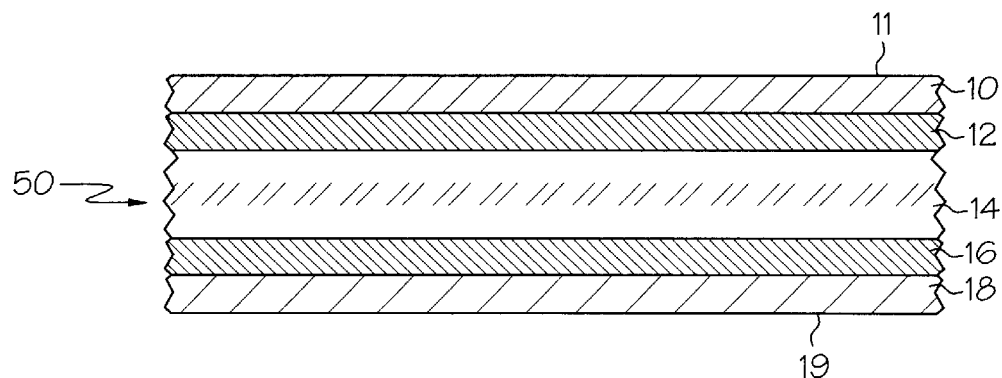
FIG. 1 is a cross sectional view of a five layered film.

Referring now to FIG. 1 is a cross sectional view of a five layered film 50. The film 50 is comprised of a first surface 11, a first skin layer 10, a first intermediate or transition layer 12, a core layer 14, a second intermediate or transition layer 16, a second skin layer 18, and a second surface 19.

In one embodiment of a five layered film 50, the first skin layer 10 comprises a silicone grafted polymer.

In a second embodiment, the first skin layer 10 comprises a silicone grafted polymer as in the first embodiment, and the second skin layer 18 comprises a silicone grafted polymer as in the first embodiment.

In a third embodiment of a five layered film 50, the first surface 11 of the first skin layer 10 is treated and the first skin layer 10 comprises a silicone grafted polymer. Possible treatments for the first surface 11 include corona discharge, flame, and plasma treatment.

In a fourth embodiment of a five layered film 50, the first surface 11 of the first skin layer 10 is treated and the first skin layer 10 comprises a silicone grafted polymer as in the third embodiment, and the second surface 19 of the second skin layer 18 is treated and the second skin layer 18 comprises a silicone grafted polymer. Possible treatments for the first surface 11 include corona discharge, flame, and plasma treatment.

Figure 2:
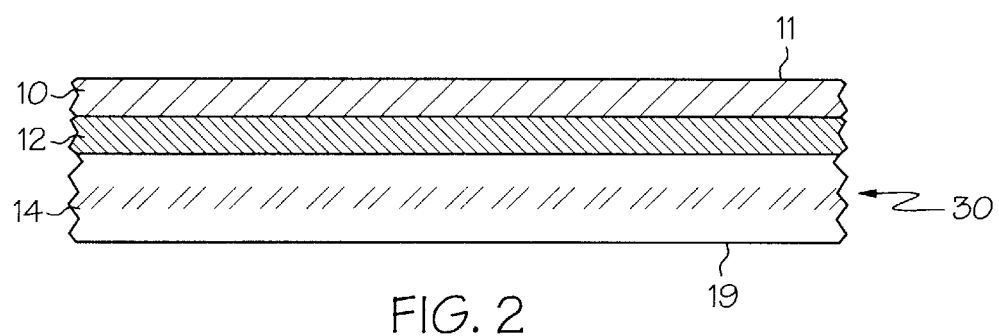
FIG. 2 is a cross sectional view of a three layered film.

Referring now to FIG. 2 is a cross sectional view of a three layered film 30. The film 30 is comprised of a first surface 11, a first skin layer 10, a first transition layer 12, a core layer 14, and a second surface 19.

In one embodiment of a three layered film 30, the first skin layer 10 comprises a silicone grafted polymer.

In a second embodiment of a three layered film 30, the first surface 11 of the first skin layer 10 is treated and the first skin layer 10 comprises a silicone grafted polymer. Possible treatments for the first surface 11 include corona discharge, flame, and plasma treatment.

Figure 3:
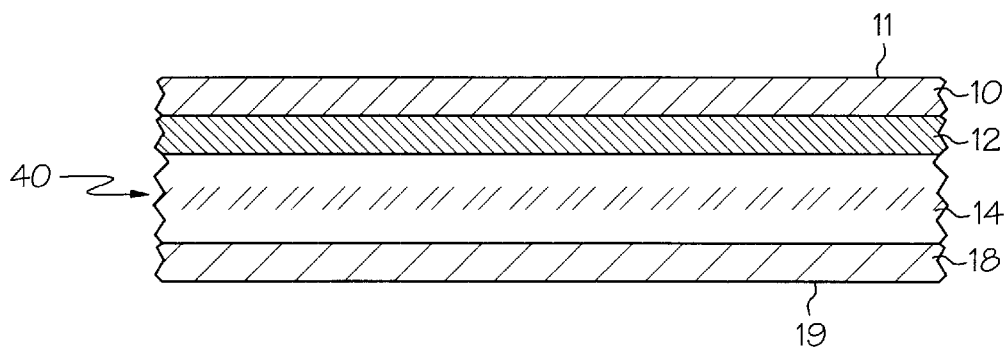
FIG. 3 is a cross sectional view of a four layered film.

Referring now to FIG. 3 is a cross sectional view of a four layered film 40. The film 40 is comprised of a first surface 11, a first skin layer 10, a first transition layer 12, an opaque core layer 14, a second skin layer 18, and a second surface 19.

In one embodiment of a four layered film 40, the first skin layer 10 comprises a silicone grafted polymer.

In a second embodiment of a four layered film 40, the first surface 11 of the first skin layer 10 is treated and the first skin layer 10 comprises a silicone grafted polymer. Possible treatments for the first surface 11 include corona discharge, flame, and plasma treatment.

Figure 4:
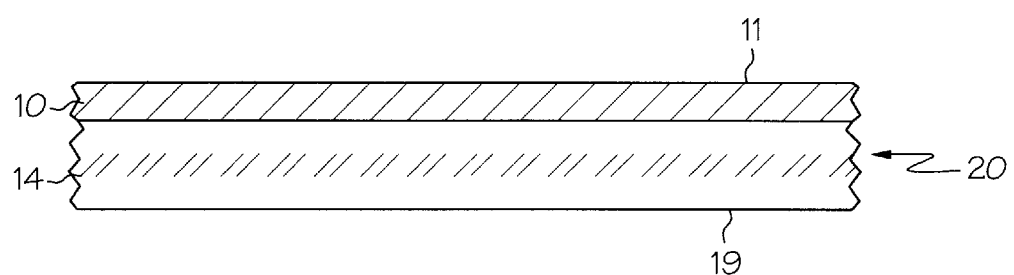
FIG. 4 is a cross sectional view of a two layered film.

Referring now to FIG. 4 is a cross sectional view of a two layered film 20. The film 20 is comprised of a first surface 11, a first skin layer 10, a core layer 14, and a second surface 19.

In one embodiment of a two layered film 20, the first skin layer 10 comprises a silicone grafted polymer.

In a second embodiment of a three layered film 30, the first surface 11 of the first skin layer 10 is treated and the first skin layer 10 comprises a silicone grafted polymer. Possible treatments for the first surface 11 include corona discharge, flame, and plasma treatment.

In one embodiment, the core layer 14 of film 50, film 30, film 40, and film 20 is a thermoplastic polymer matrix material within which is preferably located a stratum of voids. From this it is to be understood that the voids create the matrix configuration. The opacity and low light transmission of the film are preferably enhanced by the addition to the core layer 14 of at least about 1% by weight and up to about 10% by weight of void initiating on opacifying compounds, which are added to the melt mixture of the core layer 14 before extrusion. Opacifying compounds which may be used include iron oxides, carbon black, aluminum, $TiO_2$, and talc. Although one embodiment has a strata of voids located in the core layer 14, it is possible to form an opaque core layer 14 that is substantially free of voids where the opacity is achieved by the addition of opacifying compounds.

In one embodiment, from about 3% to about 9% by weight of inorganic particulate material such as $TiO_2$ and/or talc is added to the melt mixture of the core layer 14 before extrusion.

In one embodiment, when forming the core layer 14, as in U.S. Pat. Nos. 4,377,616; 4,632,869; 5,176,954; 5,397,635; 5,972,490; 4,758,396; 4,758,462; 4,652,489; 4,741,950; 4,594,211; and 6,004,664 the disclosures of which are incorporated herein by reference in their entirety, a master batch technique can be employed by either forming the void initiating particles in situ or in adding preformed spheres to a molten thermoplastic matrix material. After the formation of a master batch, appropriate dilution of the system can be made by adding additional thermoplastic matrix material until the desired proportions are obtained. However, the components may also be directly mixed and extruded instead of utilizing a master batch method.

The void-initiating particles which are added as filler to the polymer matrix material of the core layer 14 can be any suitable organic or inorganic material which is incompatible with the core material at the temperature of biaxial orientation such as polybutylene terephthalate, nylon, solid or hollow preformed glass spheres, metal beads or spheres, ceramic spheres, calcium carbonate, COC's (cyclic olefin polymers and cyclic olefin copolymers), etc.

In another embodiment, the void-initiating particle material, is incompatible with the core material, at least at the temperature of biaxial orientation. As a result of the biaxial orientation of the film structure herein, in addition to opacifying the core layer 14 of the structure, the orientation improves other physical properties of the composite layers such as flex-crack resistance, Elmendorff tear strength, elongation, tensile strength, impact strength and cold strength properties. The resulting film can have, in addition to a rich high quality appearance and excellent opacifying characteristics, low water vapor transmission rate characteristics and low oxygen transmission rate characteristics. This makes the film ideally suited for packaging food products including liquids. The film also has attractive utility as a decorative wrap material.

The polyolefin contemplated as the material in the core layer 14 includes polypropylene, polyethylene, polybutene and copolymers and blends thereof. One embodiment uses an isotactic polypropylene containing at least about 80% by weight of isotactic polypropylene, wherein it is preferred that the polypropylene have a melt flow index of from about 2 to 10 g/10 min. Another embodiment uses a high density polyethylene, with a density of 0.95 or greater. Another embodiment uses a linear low density polyethylene.

In one embodiment, the core layer 14 is derived from a polypropylene of high stereoregularity and in general may chosen from among the highly isotactic polypropylenes. The polypropylenes for this embodiment are well known in the art and are formed by polymerizing polypropylene in the presence of stereospecific catalyst systems. The polypropylenes can have a melt index at 230° C. ranging from about 1.0 to about 25.0. The crystalline melting point is about 160° C. The number average molecular weight ranges from about 25,000–100,000 and density ranges from about 0.90 to 0.91.

The polyolefin contemplated as the material in the first skin layer 10 and second skin layer 18 is selected from the group consisting of polypropylene, metallocene catalyzed linear polyethylene, EP random copolymer, PB copolymer, EPB terpolymer, MDPE, LLDPE, LDPE, EVA, EMA, surlyn ionomer, EVOH copolymer, and blends thereof.

The first skin layer 10 and/or the second skin layer 18 may be heat sealable or non heat sealable. In one embodiment, if the first skin layer 10 and/or the second skin layer 18 are not heat sealable, then a heat sealable layer (not shown) may be applied to the first skin layer 10 and/or the second skin layer 18. A heat sealable layer (not shown) may be, for example, vinylidene chloride polymer or an acrylic polymer; or heat sealable layer (not shown) may be coextruded from any of the heat sealable materials described for the first skin layer 10 and/or the second skin layer 18. Vinylidene chloride polymer or acrylic polymer coating may also be applied to the exposed first surface 11 or second surface 19.

In another embodiment, if the first skin layer 10 and/or the second skin layer 18 are heat sealable, it can be fabricated from any of the heat sealable copolymers, blends of homopolymers and blends of copolymer(s) and homopolymer(s) heretofore employed for this purpose. Illustrative of heat sealable copolymers which can be used for the first skin layer 10 and/or the second skin layer 18 of the present film are ethylene-propylene copolymers containing from about 1.5 to about 10, and preferably from about 3 to about 5 weight percent ethylene and ethylene-propylene-butene terpolymers containing from about 1 to about 10, and preferably from about 2 to about 6 weight percent ethylene and from about 80 to about 97, and preferably from about 88 to about 95 weight percent propylene. In another embodiment, heat sealable blends of homopolymer can be utilized for the first skin layer 10 and/or the second skin layer 18 which include from about 1 to about 99 weight percent polypropylene homopolymer, e.g., one which is the same as, or different from, the polypropylene homopolymer constituting core layer 14 blended with from about 99 to about 1 weight percent of a linear low density polyethylene (LDPE). If the first skin layer 10 and/or the second skin layer 18 are heat-sealable, corona or flame treatment of that layer is optional.

In another embodiment, heat sealable blends of copolymer(s) and homopolymer(s) which may be used for the first skin layer 10 and/or the second skin layer 18 include: a blend of from about 5 to about 19 weight percent of polybutylene and from about 95 to about 81 weight percent of a copolymer of is propylene (80 to about 95 mole percent) and butylene (20 to about 5 mole percent); a blend of from about 10 to about 90 weight percent of polybutylene and from about 90 to about 10 weight percent of a copolymer of ethylene (2 to about 49 mole percent) and a higher olefin having 4 or more carbon atoms (98 to about 51 mole percent); a blend of from about 10 to about 90 weight percent polybutylene and from about 90 to about 10 weight percent of a copolymer of ethylene (10 to about 97 mole percent) and propylene (90 to about 3 mole percent); and, a blend of from about 90 to about 10 weight percent of polybutylene, and from about 10 to about 90 weight percent of a copolymer of propylene (2 to about 79 mole percent) and butylene (98 to about 21 mole percent).

In one embodiment, the thickness of the first skin layer 10 and the second skin layer 18 is less than about 2 microns. In another embodiment, the thickness of the first skin layer 10 and the second skin layer 18 is less than about 1 micron. In a third embodiment, the thickness of the first skin layer 10 and the second skin layer 18 is less than about 0.5 microns.

The first skin layer 10 and the second skin layer 18 may be compounded with an anti-blocking effective amount of an anti-blocking agent, e.g., silica, clays, talc, glass, and the like, which may be provided in the form of approximately spheroidal particles. In another embodiment the antiblock comprises silica, cross-linked methylmethacrylate, montmorillonite, cross-linked polydimethylsiloxane, and blends thereof. The major proportion of these particles, for example, anywhere from more than half to as high as 90 weight percent or more, may be of such a size that a significant portion of their surface area, for example, from about 10 to about 70 percent thereof, will extend beyond the exposed first surface 11 or second surface 19.

The first skin layer 10 and/or the second skin layer 18 can also contain pigments, fillers, stabilizers, light protective agents or other suitable modifying ingredients if desired.

The polyolefin contemplated as the material in the first transition layer 12 and second transition layer 16 is selected from the group consisting of PP homopolymer, EP block copolymer, EP random copolymer, PB copolymer, EPB terpolymer, MDPE, LLDPE, LDPE, EVA, EMA, surlyn ionomer, maleic anhydride grafted polyolefins, and blends thereof.

The contemplated polyolefins which may be used for the first transition layer 12 and second transition layer 16 are comparatively low crystallinity or low stereoregularity polymers. The polyolefins can have a melt flow rate at 446 degrees F. ranging from about 2 to about 15 grams per 10 minutes, and in another embodiment from about 4 to about 9 grams per 10 minutes. The crystalline melting point can range from about less than 180 degrees F. to somewhat greater than 280 degrees F. The terpolymers will predominate in propylene, and the ethylene and 1-butene monomers can be present in approximately from 0.1:1–1:1 mole percentage in relation to each other. In one embodiment a random copolymer can be used. In another embodiment an ethylene-propylene impact copolymer or block copolymer can be used.

Suitable EPB terpolymers for the first skin layer 10, the first transition layer 12, the second transition layer 16, and the second skin layer 18 may be obtained from the random interpolymerization of from about 1 to about 8 weight percent ethylene, preferably from about 3 to about 6 weight percent ethylene with from about 65 to about 95 weight percent propylene, preferably from about 86 to about 93 weight percent propylene, butene-1 representing the balance. The foregoing EPB terpolymers are for the most part characterized by a melt index at 230° C. of from about 2 to about 16 and advantageously from about 3 to about 7, a crystalline melting point of from about 100° C. to about 120° C., an average molecular weight of from about 25,000 to about 100,000 and a density within the range of from about 0.89 to about 0.92 gm/cm$^3$.

The EP random copolymers for the first skin layer 10, the first transition layer 12, the second transition layer 16, and the second skin layer 18 may contain from about 2 to about 7 weight percent ethylene, the balance being made up of propylene. The copolymers can have a melt index at 230° C. generally ranging from about 2 to about 15 and preferably from about 3 to about 8. The crystalline melting point is usually from about 125° C. to about 150° C. and the number average molecular weight range is from about 25,000 to 100,000. The density will usually range from about 0.89 to about 0.92 gm/cm$^3$. In general, where blends of EPB terpolymer and EP random copolymer are used, said blends may contain from about 10 to about 90 weight percent EPB terpolymer and preferably from about 40 to about 60 weight percent EPB terpolymer, the balance being made up of EP random copolymer.

In another embodiment, first skin layer 10, the second skin layer 18, the first transition layer 12, and/or the second transition layer 16 may comprise a silicone grafted polymer. In one embodiment, the silicone grafted polymer is incorporated into the layer by a masterbatch which includes a silicone grafted polymer. In another embodiment, the silicone grafted polymer is formed by a chemical process. One suitable process involves partially breaking down a polyolefin with a dicumyl or benzoyl peroxide. The peroxide serves to form radicals which can be reacted with silicone monomers to form a silicone grafted polyolefin. In another embodiment, suitable silicone grafted polymers comprise silicone grafted polyolefins such as polydialkylsiloxane grafted polyolefin, dimethylsiloxane-co-hydromethylsiloxane grafted polyolefin, and polyhedral digometric silsesquioxane grafted polyolefin; dimethylsiloxane grafted acrylic copolymers; and dimethylsiloxane grafted polycarbonates.

The silicone grafted polymer may be added to the first skin layer 10, the second skin layer 18, the first transition layer 12, and/or the second transition layer 16 generally in the solid form, the silicone grafted polymer being present within this layer as discrete microglobules. The silicone grafted polymer, which is generally substantially uniformly distributed throughout the first skin layer 10, the second skin layer 18, the first transition layer 12, and/or the second transition layer 16 migrates through the layers to impart a reduced coefficient of friction to the first surface 11 and/or second surface 19.

The silicone grafted polymer may be incorporated homogeneously in first skin layer 10, the second skin layer 18, the first transition layer 12, and/or the second transition layer 16. This can be achieved by either incorporating the silicone grafted polymer as a pellet blend at room temperature and then heating the blend with the application of shearing forces or by incorporating the additive while the blend is being melted. The mixing temperature must be high enough to soften the blend and enable a very uniform mixture to be formed. The temperature required in a kneader or extruder is generally from about 170° to about 270° C.

In one embodiment, first skin layer 10, the second skin layer 18, the first transition layer 12, and/or the second transition layer 16 comprise up to about 4 percent by weight of the silicone grafted polymer. In another embodiment, first skin layer 10, the second skin layer 18, the first transition layer 12, and/or the second transition layer 16 comprise up to about 2 percent by weight of the silicone grafted polymer. In another embodiment, first skin layer 10, the second skin layer 18, the first transition layer 12, and/or the second transition layer 16 comprise from about 0.5 percent by weight to about 2 percent by weight of the silicone grafted polymer.

In one embodiment, the exposed first surface 11 and/or second surface 19 are treated in a known and conventional manner, e.g., by corona discharge to improve its receptivity to inks and/or its suitability for such subsequent manufacturing operations as lamination.

In one embodiment, the exposed treated or untreated first surface 11 and/or second surface 19 have applied to it, coating compositions or substrates such as another polymer film or laminate; a metal foil such as aluminum foil; cellulosic webs, e.g. numerous varieties of paper such as corrugated paperboard, craft paper, glassine, cartonboard; nonwoven tissue, e.g., spunbonded polyolefin fiber, melt-blown microfibers, etc. The application may employ a suitable adhesive, e.g., a hot melt adhesive such as low density polyethylene, ethylene-methacrylate copolymer, water-based adhesive such as polyvinylidene chloride latex, and the like.

In one embodiment, the film of the present invention is extrusion laminated to another polyolefin film.

In one embodiment, the first skin layer 10, first transition layer 12, core layer 14, second transition layer 16, and/or second skin layer 18 are coextruded. Thereafter, the film may be biaxially oriented. For example, when employing polypropylene for the core matrix and the skin layers and employing PBT as the void initiating particles, a machine direction orientation is preferably from about 4 to about 8 and a transverse orientation is preferably from 4 to about 10 times at a drawing temperature of about 100 degrees C. to 170 degrees C. to yield a biaxially oriented film. A preferred film thickness is from about 0.5 mil to about 3.5 mils.

In another embodiment the first skin layer 10 and/or the second skin layer 18 has a coating or metal layer applied. U.S. Pat. Nos. 6,077,602; 6,013,353; 5,981,079; 5,972,496; 6,074,762; 6,025,059; and 5,888,648 disclose the use of coatings and/or metal layers on a film, and are disclosed herein by reference. In one embodiment, suitable coatings may include PVdC's or acrylics which serve to boost gloss, enhance machineability, and/or enhance ink adhesion; suitable metals may include aluminum.

Although certain preferred embodiments have been disclosed for the five layer film 50, three layer film 30, and four layer film 40, additional embodiments of films with three or more layers are possible by interchanging elements already disclosed that would be clear to one with ordinary skill in the art.

The following examples illustrate the present invention:

Example 1) A three-layer, A/B/C, BOPP film was made. B-layer was a core-layer about 20 microns comprising polypropylene homopolymer from Fina Chemicals as Fina 3371. A-layer was a skin layer about 1 micron comprising 95 wt % of polypropylene homopolymer, 4 wt % of trimethylsiloxy-terminated silicone gum compound from Shin-Etsu silicones as Shin-Etsu X-22-2138, and 1 wt % of silicone grafted on acrylic copolymer backbone from Shin-Etsu Silicones as Shin-Etsu X-22-8084. C-layer was a functional skin layer about 1 micron comprising metallocene linear polyethylene from Phillips Petroleum Company as mPACT D350. The C-layer was flame treated. A-layer was not treated. The film was printed with ink on the surface of C-layer. Good ink adhesion was observed.

Example 2) A three-layer, A/B/C, BOPP film was made. B-layer was a core-layer about 20 microns comprising polypropylene from Fina Chemicals as Fina 3371. A-layer was a skin layer about 1 micron comprising 99 wt % of polypropylene homopolymer, 0.5 wt % of silicone gum diluted from the masterbatch MB50-001 made by Dow Corning, and 0.5 wt % of silicone grafted on acrylic copolymer backbone from Shin-Etsu Silicones as Shin-Etsu X-22-8084. C-layer was a skin layer about 1 micron comprising metallocene linear polyethylene from Phillips Petroleum Company as mPACT D350. The C-layer was flame treated. A-layer was not treated. The film was printed with ink on the surface of C-layer. Good ink adhesion was observed.

Example 3) A three-layer, A/B/C, BOPP film was made. B-layer was a core-layer about 16 microns comprising polypropylene from Fina Chemicals as Fina 3371. A-layer was a skin layer about 1 micron comprising ethylene-propylene-butene-1 terpolymer loaded with 2500 ppm of silicone grafted on acrylic copolymer backbone from Shin-Etsu Silicones as Shin-Etsu X-22-8084 and 2400 ppm of silica from W. R. Grace as S45. C-layer was a linear high density polyethylene about 1 micron from Equistar as Equistar 6030. C-layer was flame treated. Aluminum vacuum metallization was made on the surface of C-layer. Good metal adhesion was observed.

We claim:

1. A thermoplastic film comprising:
    (a) a base layer comprising a polyolefin; and
    (b) a skin layer comprising a silicone grafted thermoplastic polymer, wherein the skin layer is exterior to the base layer, and wherein the silicone grafted thermoplastic polymer is selected from the group consisting of dimethylsiloxane-co-hydromethylsiloxane grafted polyolefin, polyhedral digometric silsesquinoxane grafted polyolefin, dimethylsiloxane grafted acrylic copolymer, and dimethylsiloxane grafted polycarbonate.

2. The film of claim 1 in which the silicone grafted thermoplastic polymer of the skin layer comprises a dimethylsiloxane-co-hydromethylsiloxane grafted polyolefin.

3. The film of claim 1 in which the silicone grafted thermoplastic polymer of the skin layer comprises a polyhedral digometric silsesquioxane grafted polyolefin.

4. The film of claim 1 in which the silicone grafted thermoplastic polymer of the skin layer comprises a dimethylsiloxane grafted acrylic copolymer.

5. The film of claim 1 in which the silicone grafted thermoplastic polymer of the skin layer comprises a dimethylsiloxane grafted polycarbonate.

6. The film of claim 1 in which a sufficient amount of silicone grafted thermoplastic polymer is incorporated in the skin layer as to migrate through the skin layer to an exposed surface of the skin layer to confer a coefficient of friction of less than about 0.7.

7. The film of claim 1 in which a sufficient amount of silicone grafted thermoplastic polymer is incorporated in the skin layer as to migrate through the skin layer to an exposed surfaces of the skin layer to confer a coefficient of friction from about 0.2 to about 0.5.

8. The film of claim 1 wherein the skin layer further comprises an antiblock agent and wherein at least a major proportion of the antiblock agent is in the form of particles of approximately spherical shape.

9. The film of claim 8 wherein the antiblock agent is selected from the group consisting of silica, cross-linked methylmethacrylate, montmorillonite, cross-linked polydimethylsiloxane, and blends thereof.

10. The film of claim 1 wherein from about 10 to about 70 percent of the total surface area of the antibiock agent extends beyond the exposed surface of the skin layer.

11. The film of claim 1 wherein the skin layer further comprises a polymer selected from the group consisting of a polypropylene, an ethylene-propylene-butene-1 terpolymer, an ethylene-propylene random copolymer, a propylene-butene-1 copolymer, a metallocene catalyzed linear polyethylene, and mixtures thereof.

12. The film of claim 1 wherein the skin layer further comprises a blend of an ethylene-propylene-butene-1 terploymer and an ethylene-propylene random copolymer, and wherein the ethylene-propylene-butene-1 terpolymer component comprises from about 10 to about 90 weight percent of the blend and the ethylene-propylene random copolymer comprises from about 10 to about 90 weight percent of the blend.

13. The film of claim 1 in which the skin layer further comprises an ethylene-propylene-butene-1 terploymer, and wherein the ethylene-propylene-butene-1 terpolymer is obtained from the random interpolymerization of from about 1 to about 8 weight percent ethylene with from about 65 to 95 propylene with butene-1 making up the balance of the terpolymer.

14. The film of claim 1 in which the skin layer further comprises an ethylene-propylene-butene-1 terploymer, and wherein the ethylene-propylene-butene-1 terpolymer is obtained from the random interpolymerization of from about 3 to about 6 weight percent ethylene with from about 86 to about 93 weight percent propylene with butene-1 making up the balance of the terpolymer.

15. The film of claim 1 in which the skin layer further comprises an ethylene-propylene random copolymer, and wherein the ethylene-propylene random copolymer is obtained from the random co-polymerization of from about 2 to about 7 weight percent ethylene with propylene making up the balance of the copolymer.

16. The film of claim 1 in which the skin layer further comprises a propylene-butene-1 copolymer, and wherein the propylene-butene-1 copolymer is obtained from the random co-polymerization of from about 1 to about 12 weight percent butene-1 with propylene making up the balance of the copolymer.

17. The film of claim 1 wherein the base layer comprises a polymer selected from the group consisting of a polypropylene homopolymer, a high-density polyethylene, a linear low-density polyethylene, a ethylene-propylene copolymer, and mixtures thereof.

18. The film of claim 1 wherein the base layer comprises a polypropylene homopolymer.

19. The film of claim 1 in which the base layer comprises at least about 70 percent of the total thickness of the film.

20. The film of claim 19 in which the total thickness of the film is from about 0.35 to about 2.0 mils.

21. The film of claim 1 wherein the skin layer has a thickness of about 0.1 to about 3 microns.

22. The film of claim 1 wherein the skin layer comprises from about 0.2% to about 4% by weight of the silicone grafted thermoplastic polymer.

23. The film of claim 1 wherein the skin layer comprises from about 0.6% to about 2% by weight of the silicone grafted thermoplastic polymer.

24. The film of claim 1 in which said skin layer (b) is a first skin layer, wherein said base layer (a) is a core layer, and wherein said film further comprises a second skin layer comprising a polyolefin wherein the second skin layer is exterior to the core layer, and wherein the second skin layer is on the opposite side of the core layer than the first skin layer.

25. The film of claim 24 wherein the exterior side of the second skin layer is metallized.

26. The film of claim 1 wherein the exterior side of the skin layer is coated with a coating selected from the group consisting of acrylic, PVDC, PVOH, and mixtures thereof.

27. A thermoplastic film comprising:
    (a) a base layer comprising a polyolefin;
    (b) a transition layer comprising a polyolefin wherein the transition layer is exterior to the base layer; and
    (c) a skin layer comprising a silicone grafted thermoplastic polymer, wherein the skin layer is exterior to the base layer and the transition layer, such that the transition layer is between the base layer and the skin layer, and wherein the silicone grafted thermoplastic polymer is selected from the group consisting of dimethylsiloxane-co-hydromethylsiloxane grafted polyolefin, polyhedral digometric silsesquinoxane grafted polyolefin, dimethylsiloxane grafted acrylic copolymer, and dimethylsiloxane grafted polycarbonate.

28. The film of claim 27 in which said skin layer (c) is a first skin layer, wherein said base layer (a) is a core layer, and wherein said film further comprises a second skin layer comprising a polyolefin wherein the second skin layer is exterior to the core layer, and wherein the second skin layer is on the opposite side of the core layer than the first skin layer.

29. The film of claim 28 in which said transition layer (b) is a first transition layer, and wherein said film further comprises a second transition layer comprising a polyolefin wherein the second transition layer is exterior to the core layer, and wherein the second transition layer is on the opposite side of the core layer than the first transition layer and the first skin layer, and wherein the second transition layer is between the core layer and the second skin layer.

30. A method of making a film according to claim 1 comprising the steps of:
    (1) coextruding a film through a die wherein the film comprises a base layer comprising a polyolefin; and a skin layer comprising a silicone grafted thermoplastic polymer, wherein the skin layer is exterior to the base layer, and wherein the silicone grafted thermoplastic polymer is selected from the group consisting of dimethylsiloxane-co-hydromethylsiloxane grafted polyolefin, polyhedral digometric silsesquinoxane grafted polyolefin, dimethylsiloxane grafted acrylic copolymer, and dimethylsiloxane grafted polycarbonate;
    (2) cooling/quenching the film; and
    (3) orienting the film in the machine direction.

31. The method of claim 30 further comprising the step of orienting the film in the transverse direction.

* * * * *